United States Patent
Hansen et al.

(10) Patent No.: US 8,607,815 B2
(45) Date of Patent: Dec. 17, 2013

(54) BUTTERFLY VALVES WITH UNDULATING SEALING SURFACE

(75) Inventors: Robert A. Hansen, Oakdale, MN (US); Daniel Sabelko, Elk River, MN (US)

(73) Assignee: Dynamic Air Inc., St. Paul, MN (US)

( * ) Notice: Subject to any disclaimer, the term of this patent is extended or adjusted under 35 U.S.C. 154(b) by 0 days.

(21) Appl. No.: 13/506,753

(22) Filed: May 15, 2012

(65) Prior Publication Data

US 2012/0227833 A1    Sep. 13, 2012

Related U.S. Application Data

(63) Continuation of application No. 12/459,328, filed on Jun. 30, 2009, now Pat. No. 8,256,450.

(51) Int. Cl.
*F16K 25/00* (2006.01)

(52) U.S. Cl.
USPC ........... 137/340; 251/173; 251/307; 277/605; 277/646

(58) Field of Classification Search
USPC .......... 251/173, 305–308; 137/334, 338–340; 277/605, 646
See application file for complete search history.

(56) References Cited

U.S. PATENT DOCUMENTS

| | | | | |
|---|---|---|---|---|
| 1,834,988 A | * | 12/1931 | White | 251/173 |
| 1,844,641 A | * | 2/1932 | De Wein | 251/173 |
| 1,990,309 A | * | 2/1935 | Phillips | 137/246.22 |
| 2,081,842 A | * | 5/1937 | Brunswick | 251/173 |
| 2,705,016 A | * | 3/1955 | Saar | 137/1 |
| 2,970,803 A | * | 2/1961 | Harza | 251/175 |
| 3,026,083 A | * | 3/1962 | McLaren et al. | 251/173 |
| 3,043,557 A | * | 7/1962 | Stillwagon | 251/306 |
| 4,067,352 A | * | 1/1978 | Halpine | 137/312 |
| 4,176,675 A | * | 12/1979 | Liberman | 137/340 |
| 4,327,765 A | * | 5/1982 | Wilson et al. | 137/312 |
| 4,800,915 A | * | 1/1989 | Hormel | 137/340 |
| 4,836,499 A | * | 6/1989 | Steele et al. | 251/173 |
| 5,160,118 A | * | 11/1992 | Stary | 251/173 |
| 5,295,659 A | * | 3/1994 | Steele | 251/173 |

* cited by examiner

*Primary Examiner* — John Bastianelli
(74) *Attorney, Agent, or Firm* — Jacobson & Johnson LLC

(57) ABSTRACT

A butterfly valve with an undulating sealing surface, which has an inflatable annular seal mounted in a housing. A disk is pivotally mounted in the housing and has an edge with an undulating sealing surface and a peripheral sealing edge. The undulating sealing surface of the disk and a sealing face of the annular seal have non-mating profiles when the valve is in an unsealed condition. Pressure in a chamber proximate the annular seal causes the face of the annular seal to expand and deform and the face forms a high-pressure seal between the sealing ridge and the annular seal. Also includes a method for stopping delivery, of a conduit transportable material through a butterfly valve.

5 Claims, 5 Drawing Sheets

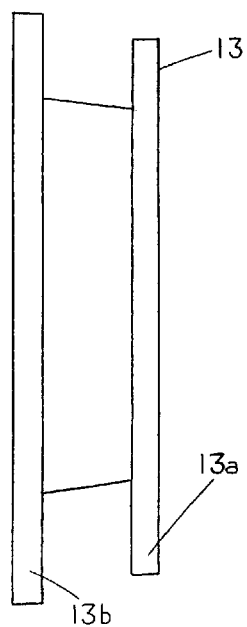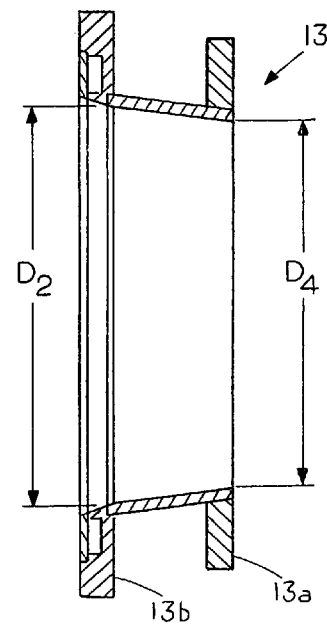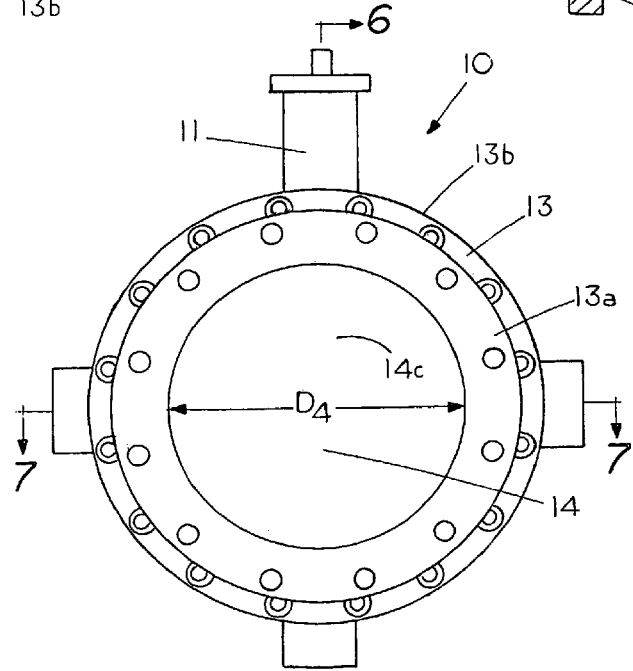

BUTTERFLY VALVES WITH UNDULATING SEALING SURFACE

CROSS REFERENCE TO RELATED APPLICATIONS

This application is a continuation application of Ser. No. 12/459,328 filed Jun. 30, 2009 now U.S. Pat. No. 8,256,450 titled BUTTERFLY VALVES.

FIELD OF THE INVENTION

This invention relates generally to butterfly valves and, more specifically, to a high pressure seal around a rotatable disk of a butterfly valve.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of butterfly valves with a central pivotable disk is known in the art. One such butterfly valve is shown in Steele et al. U.S. Pat. No. 4,836,499 and another is shown in Steele U.S. Pat. No. 5,295,659. In both valves a central disk pivots from a transverse or closed position, where the disk extends across a flow passage to block materials from passing through the valve, to an axial or open position, where materials enter one side of the valve and flow laterally alongside the disk faces before being discharged from the opposite side of the valve. To seal the valve the disk is positioned in the transverse position and an annular elastomer seal or sealing ring is inflated to engage an edge of the disk to form an annular seal around the periphery of the disk. To pivot the disk to an open condition or flow through condition the elastomer seal is deflated and the disk is pivoted from the closed position to an open position.

One of the difficulties with butterfly valves is obtaining a high-pressure seal between the annular edge of the pivotal disk and an inflatable seal which will not leak as the pressure differential across the disk increases.

SUMMARY OF THE INVENTION

A butterfly valve having a pressure deformable elastomer seal and a rotatable disk with the rotatable disk including a sealing ridge for forming a high pressure seal with the pressurized deformable elastomer seal to thereby isolate the pressure on one side of the rotatable disk from the pressure on the opposite side of the disk even though an unpressurized profile of the annular seal need not be the same as a profile of the sealing edge of the rotatable disk.

BRIEF DESCRIPTION OF THE DRAWINGS

FIG. 3 is a side view of a collar of the butterfly valve of FIG. 1;

FIG. 4 is a sectional view of the collar of FIG. 3;

FIG. 5 is an end view of the butterfly valve in the closed position;

DESCRIPTION OF THE PREFERRED EMBODIMENT

Figure 1:
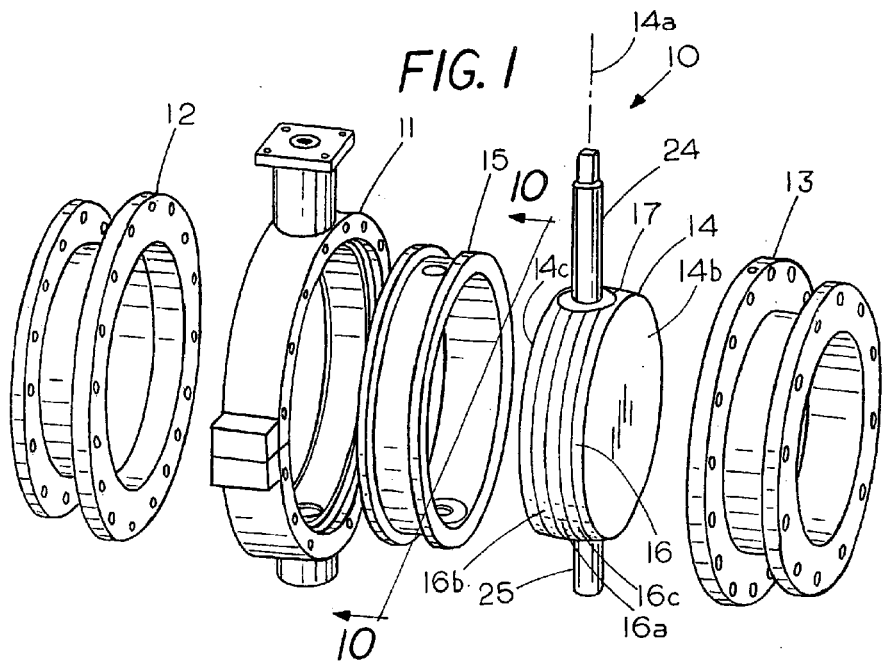
FIG. 1 is an exploded view of a butterfly valve with ridge sealing.
Figure 10:
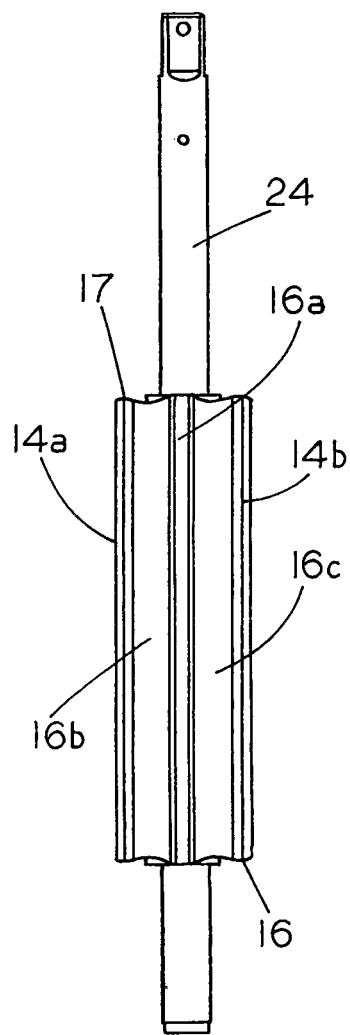
FIG. 10 is side view of the butterfly valve disk and shaft.

FIG. 1 is an exploded view of a butterfly valve 10 having a rotatable disk 14 to open and close the butterfly valve 10 while FIG. 10 shows an end view of the butterfly valve rotatable disk 14 in the assembled condition. Disk 14, which is shown in perspective view in FIG. 1 and in side view in FIG. 10, includes a first circular face 14b and a second circular face 14c with a peripheral edge 17 having an undulating sealing surface 16 extending from circular face 14c of disk 14 to circular face 14b of disk 14. The undulating sealing surface 16 of disk 14 includes a central peripheral sealing ridge 16a with a first peripheral sealing groove 16b proximate one side of sealing ridge 16a and a second peripheral sealing groove 16c proximate the opposite side of sealing ridge 16a. Although sealing grooves are shown proximate the sealing ridge 16a in some applications it may be desirable to omit the sealing grooves from the undulating sealing surface 16.

Typically, butterfly valves have annular inflatable seals, which are made from elastomers that can expand to engage the peripheral edge of a rotatable disk to thereby close the valve and can conversely contract to allow the rotatable disk to open. To obtain a seal between the peripheral sealing surface of the disk and the elastomer the sealing surface of the disk and the sealing surface of the elastomers have been provided with mating shapes such that the profiles of the sealing surfaces are similar or identical.

When transferring materials the butterfly valve 10 may be connected to a conduit through an inlet collar 12, a housing 11 and an outlet collar 13 as shown in FIGS. 3-7. FIG. 3 shows a side view collar 13 having a faceplate 13a for attachment to a conduit and a faceplate 13b for attachment to the housing 11 of butterfly valve 10. FIG. 4 is a cross section view of collar 13 showing the inlet has a diameter $D_4$ and the outlet a diameter $D_2$ with the diameter $D_2$ greater than the diameter $D_4$.

Figure 6:
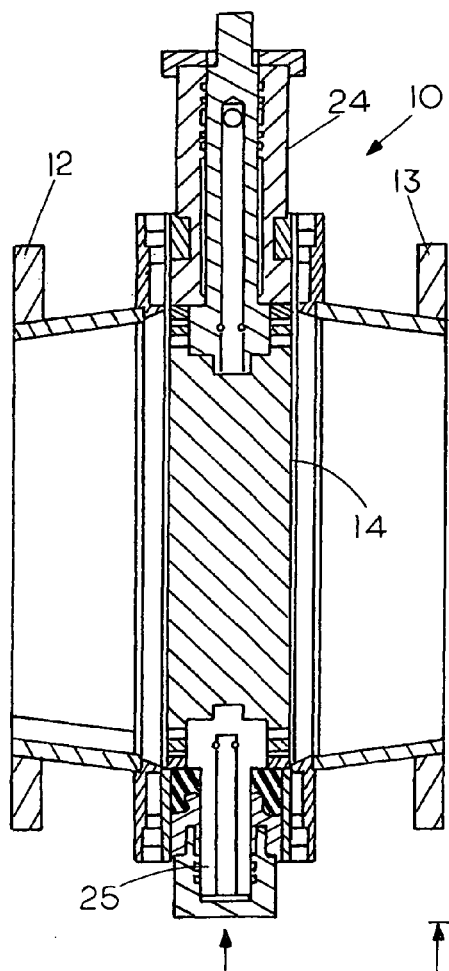
FIG. 6 is a sectional view taken along lines 6-6 of FIG. 5.
Figure 7:
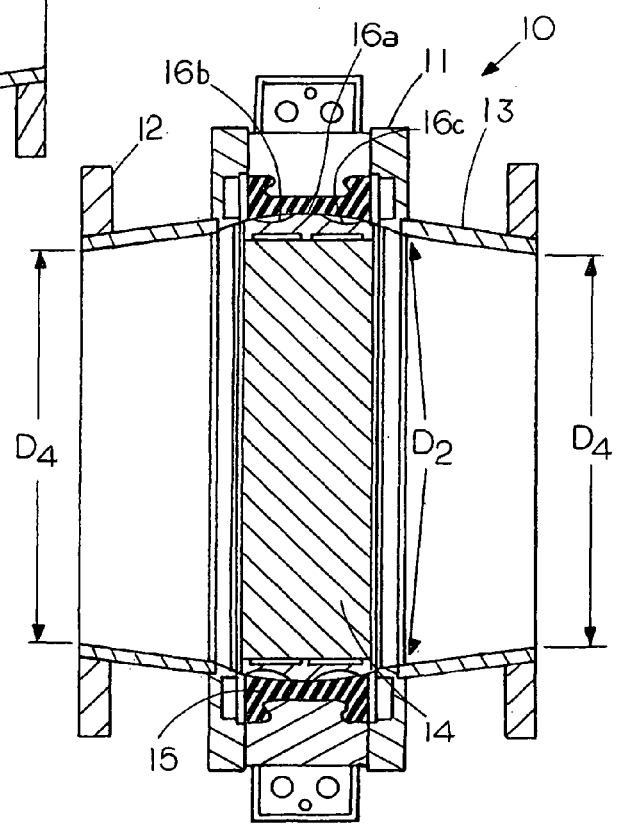
FIG. 7 is a sectional view taken along lines 7-7 of FIG. 5.

FIG. 7 is a sectional view of the butterfly valve 10 in the assembled and closed condition illustrating the diameter of the passage $D_2$ through the butterfly valve is the same or larger than the diameter of the conduit $D_4$ to minimize materials from impinging on the annular seal as the materials flow through the butterfly valve. Similarly, FIG. 6 shows an assembled view of housing 11, collar 12 and collar 13 in a sectional view through shaft 24 taken along lines 6-6 of FIG. 5. FIG. 6 and FIG. 7 show an assembled sectional view of housing 11, collar 12 and 13 with the expandable annular sealing ring 15 in a relaxed or unsealed condition. Both views show the disk 14 in the closed position.

FIG. 5 shows an end view of an example of a butterfly valve 10 and collar 13 with disk 14 located in the closed position. Collar 13 includes a central opening having a diameter $D_4$. If disk 14 is rotated 90 degrees transportable materials can flow on both sides of disk 14 in a substantially straight flow path without impingement of the transportable material with annular seal 15 since the annular seal 15 is radially offset and therefore is inhibited from contact with the transportable material. Although in other applications one may want to maintain a different relationship between the diameter of the central opening in the butterfly valve and the diameter of the conduit connected to the butterfly valve. For example, one may want to use the scouring action of the transportable materials to maintain the sealing surface of the annular seal in a ready condition for sealing. Thus the diameter of the conduit may if desired be equal to or greater than the diameter of the opening in the butterfly valve without departing from the spirit and scope of the present invention.

The disk 14, which is rotatable supported in housing 11 is pivotable about a spindle axis 14a (FIG. 1 and FIG. 2) to enable the disk 14 to be opened and closed. If disk 14 extends transverse to the conduit, as illustrated in FIG. 1, FIG. 5, FIG. 6 and FIG. 7, it prevents flow of materials through the valve 10. If disk 14 is pivoted 90 degrees about axis 14a the disk 14 is an open position with the disk 14 parallel to a central axis of collars 13 and 14 which allows material to flow past face 14b and face 14c as the material flows through the valve 10.

Figure 8:
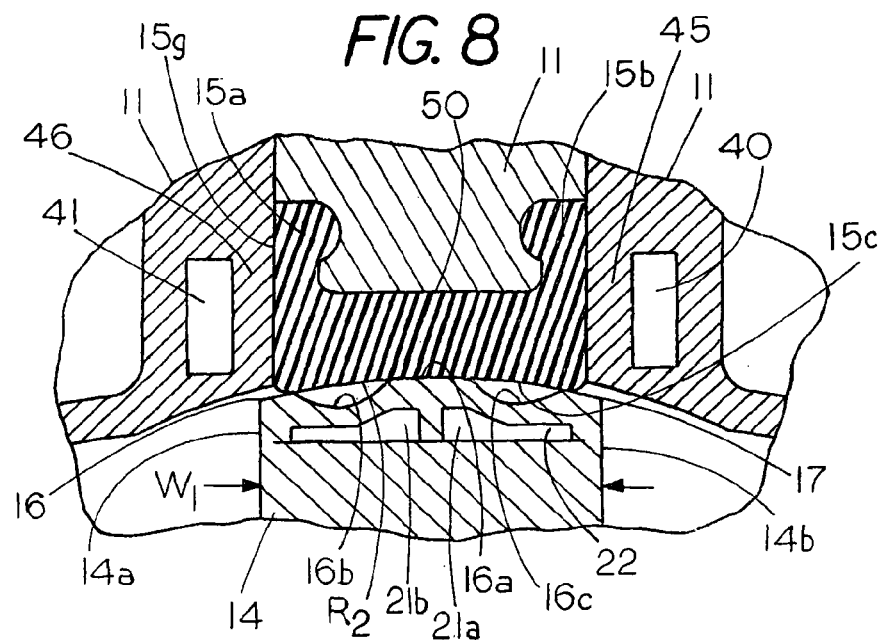
FIG. 8 is an enlarged section view of a portion of the disk and the annular seal in a non-sealing mode.
Figure 11:
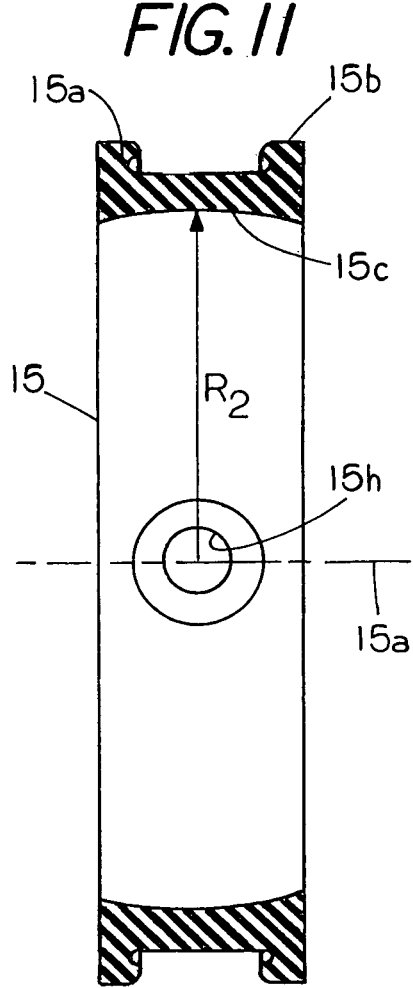
FIG. 11 is an isolated sectional view of the annular seal of the butterfly valve, taken along lines 10-10 of FIG. 1.

FIG. 11 shows an isolated view of the inflatable annular seal 15 taken along lines 10-10 of FIG. 1 showing annular lobes 15a and 15b that extend around the periphery of seal 15 for forming holding and mating engagement with the housing 11 as illustrated in FIG. 8. In the example shown the annular seal 15 contains a curved disk sealing surface 15c having a radius of curvature $R_2$ that extends from central axis 15e. The radius of curvature of the sealing member surface 15c, which is measured from the central axis 15e to the outer surface 15c. While a radiused shape is shown as the sealing surface of annular seal member 15 other shapes of the sealing surface may be used without departing from the spirit and scope of the invention.

The annular seal 15, which expands radially inward to seal the valve and contracts radially outward to unseal the valve, is typically made from materials such as elastomers. An example of an elastomer seal that expands and contract to seal and unseal a butterfly valve is shown in Steele U.S. Pat. No. 4,836,499.

Figure 2:
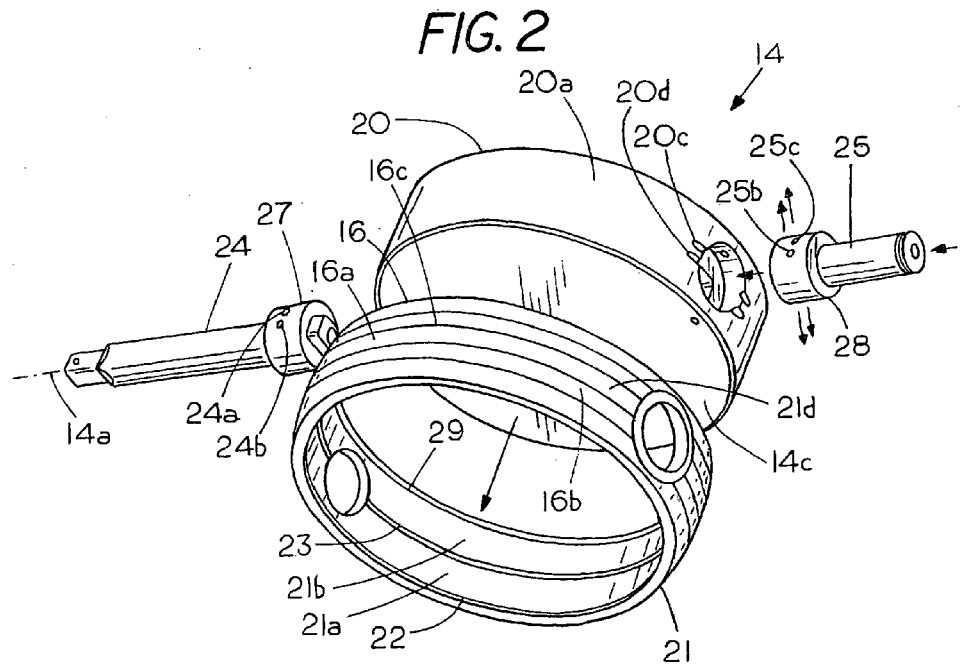
FIG. 2 is an exploded view of the disk of the butterfly valve of FIG. 1.

A feature of the present invention is that it may be used either with butterfly valves that are cooled or butterfly valves which are not cooled. FIGS. 1 and 2 illustrate an example of a butterfly valve 10 with cooling passages in the disk 14 for use in maintaining the temperature of the elastomer seal below the breakdown temperature. In other examples, the cooling passages may be omitted. A butterfly valve with cooling passages is shown in greater detail in copending patent application Ser. No. 12/150,715 which was filed Apr. 30, 2008 and is hereby incorporated in its entirety by reference.

FIG. 2 is an exploded view of disk 14 of the butterfly valve 10 of FIG. 1 with disk 14 including cooling passages. Disk 14 includes a massive central disk member 20 and a rim 21 that fits on the peripheral edge face 20a of central disk member 20. Located on the interior of rim 21 are three rings, an outer rib or ring 29, a central rib or ring 23 and an outer rib or ring 22. A first annular cooling channel 21b is located between outer ring 29 and central ring 23. Similarly, an annular cooling channel 21a is located between central ring 23 and outer ring 22. When assembled sealing ring 21 is secured to central disk member 20. Spindle shaft 25 and spindle shaft 24 are secured to rim 21 and central disk member 20 allowing the disk 14, rim 21 and shafts 24 and 25 to operate as a single unit. For example, when rim 21 is placed on the peripherally surface 20a of central member 20 the peripheral surface 20a of central member 20 engages the rings 22, 23 and 29 so that annular cooling channel 21a in rim 21 and annular cooling channel 21b in rim 21 are internally bounded by surface 20a on disk member 20 to thereby form two side by side cooling conduits 21a and 21b. While two cooling channels are shown more or less cooling conduits may be used to cool the surface 21d of the disk 14 that comes into contact with the annular seal 15. The position of the cooling conduits 21a and 21b with respect to central disk member 20 and annular seal 15 is shown in FIG. 8 as the central member 20 and rim 21 coact to form two peripherally cooling conduits which have an annular configuration and with an elongated cross section. The rim 21 and central member are secured to each other to maintain the rim 21 in fixed position on central member 20, for example rim 21 may be secured thereto by welding or the like. Central member 20, which can function as a heat sink to absorb heat from materials while the cooling system dissipate heat a constant rate although hollow central members may be used in some systems.

FIG. 2 shows that disk 14 includes a first hollow shaft 25 with a hub 28 extending outward from one end of central disk member 20 and a second hollow shaft 24 having a hub 27 extending outward from an opposite end of central disk member 20 with the shafts 24 and 25 located diametrically opposite from each other. Shafts 24 and 25 provide a dual purpose, first they allow one to rotate disk 14, about axis 14a, from the closed position to the open position and vice versa. In addition, both shafts permit the axial flow of a cooling fluid therethrough. When assemble the hub 28 fits in rim 21 with conduit 25b in fluid communication with passage 20d and conduit 25c in fluid communication with passage 20c. Similarly, identical fluid passages or conduits are located on the opposite side of hub 28 to direct cooling fluid threrethrough (see arrows). Typically, shafts 24 and 25 may be affixed to rim 21 by welding or the like. In addition the disk member 20 may also be affixed to rim 21 by welding to form a disk 14 of unitary construction.

Figure 9:
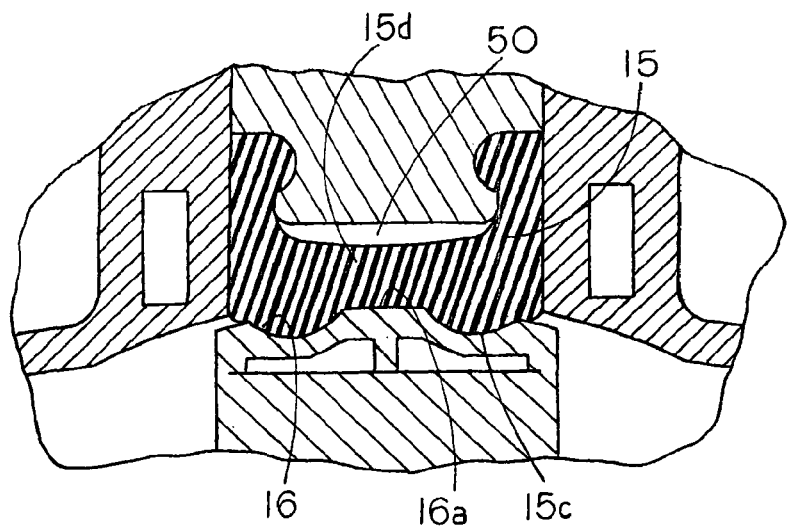
FIG. 9 is an enlarged section view of the portion of the disk of FIG. 8 in the sealing mode.

FIG. 8 shows a cross sectional view of deformable elastomer seal 15 in a relaxed or unpressurized condition proximate the undulating sealing surface 16 on edge 17 of disk 14. A pair of lobes comprising a set of integral circumferential legs 15a and 15b, which are located along the outer lateral faces of seal 15 support elastomer seal 15 in housing 11. As shown in the example of FIG. 8 when the elastomer seal 15 is in the unpressurized condition sealing face 15c includes a smoothly contoured surface for forming sealing engagement with the undulating sealing surface 16 on disk 14. The lobes 15a and 15b are mounted in housing 11 to restrain the annular seal 15 as the annular seal is inflated during the formation of a seal between the disk 14 and the annular seal 15. During the inflation process the elastic resistance of legs 15a and 15b to radial expansion is overcome by the increase of fluid pressure in chamber 50 which brings the sealing surface 15c into sealing contact with the undulating sealing surface 16 of the disk 14. As illustrated in FIG. 9 the intermediate portion of annular seal 15, which is located between integral legs 15a and 15b, offers less resistance to radial inward expansion since it is only indirectly supported through legs 15a and 15b. Consequently, a uniform pressure in chamber 50 can produce a higher surface pressure of elastomer seal 15 in the central portion of annular seal 15 than in the peripheral portions of seal 15 since the resistance of legs 15a and 15b does not need to be overcome.

In the example shown the elastomer seal 15 contains a smoothly contoured sealing surface 15c, as can be seen in FIG. 8 and the central member or disk 14 contains a peripheral edge 17 with an undulating sealing surface 16 thereon that has an unmateable profile with the sealing surface 15c of annular seal 15 when the elastomer seal is in an unpressurized condition.

FIG. 9 shows a cross sectional view of deformable elastomer seal 15 in a pressurized condition revealing the conforming of the shape of the elastomer seal 15 to the shape of the undulating sealing surface 16 on edge 17 of the disk 14. That is, the undulating sealing surface 16 on disk 14 is located in pressure contact with the annular sealing face 15c even though in the unpressurized condition they have unmateable profiles. As a result of increasing the pressure in chamber 50 the elastomer seal 15 can be deformed into engagement with the undulating sealing surface 16 of the central member 14. It has been found that in the pressurized condition the sealing face 15c of the elastomer seal 15 forms high pressure sealing engagement with a sealing ridge 16a of the undulating sealing surface 16 that provides a high pressure seal between one side of the annular disk 14 and the other side of disk 14.

Increasing the pressure in chamber 15, which is located proximate a back side of an annular seal 15 that is secured at opposite sides thereof by lobes 15a and 15b, causes face 15c of the annular seal 15 to flex as it expands and deforms until an intermediate portion 15d of the face 15c of the annular seal forms a high pressure seal between the sealing face 15c and the annular sealing ridge 16a. It has been found that even though the sealing between a disk 14 and an annular seal 15 have unmateable profiles, the seal can be more effective than if the sealing surface of the disk and the sealing surface of the annular seal have mating profiles when the annular seal is in the unpressurized condition. With inflation pressure, one applies pressure to force the massive central portion of annular seal 15 to conform to the shape of the undulating sealing surface 16 of the disk 14 to form what is referred to in the art as a bubble tight seal therebetween. It is believed that the high pressure seal is at least partly due to engagement between the sealing ridge 16a and the intermediate portion 15d of the annular seal 15 which is located between legs 15a and 15b since the legs 15a and 15b provide a tensile resistance to expansion of the annular seal while the intermediate portion of the annular seal between legs 15a and 15b is free to deflect without overcoming direct tensile resistance. Consequently, even though the pressure in chamber 50 is equal to the intermediate portion of the annular seal, it lacks the need to overcome the tensile resistance force of the integral circumferential legs 15a and 15b as the elastomer seal is radially expanded inward. Since the elastomer seal 15 is sufficiently massive in the intermediate portion the elastomer seal can deform to engage the entire tortuous or undulating surface 16 of disk 14 and form a tortuous fluid path therebetween.

While the butterfly valve shown herein may be used with or without cooling, the example FIG. 8 shows, a first cooling conduit 41 is located on a lateral annular face of annular seal 15 and a second cooling conduit 40 is located on an opposite lateral face of annular seal 15. Conduit 40 is formed by housing 11 and an annular heat-conducting flange 45. Similarly, conduit 41 is formed by housing 11 and an annular heat-conducting flange 46. Similarly, annular disk 14 includes cooling passages 21b and 21a. While elastomers breakdown at temperature considerably less than the temperatures which metals can withstand, they are also poor heat conductors. Nevertheless, by placing cooling conduits on the opposed lateral faces 15g and 15h of annular seal 15 and limiting the contact area of the hot materials to the annular seal 15, one can cool the annular seal 15 to further inhibit breakdown of the annular seal 15 and housing 11, which supports the annular seal and can also be maintained at a temperature below the breakdown temperature of the annular seal 15.

With the use of cooling of the flange and the disk, the method of forming a high pressure seal on a sealing ridge on the disk can be used for intermittent delivery of hot conduit transportable materials though valve 10 even though portions of the valve may have a breakdown temperature that is less than the temperature of the transportable materials since the annular seal is protected from contact with the hot transportable materials.

We claim:

1. A butterfly valve for opening and closing a passage comprising;
   a housing;
   a central member pivotally mounted in said housing with said central member having a sealing surface including a sealing ridge and a sealing groove; and
   an inflatable elastomer seal having a set of circumferential legs providing a tensile resistance to an expansion of the elastomer seal while an intermediate portion of the elastomer seal between the set of circumferential legs is free to deflect without overcoming the tensile resistance the sealing surface of the central member and a sealing surface of the elastomer seal having unmateable profiles when the elastomer seal is in an unpressurized condition with the sealing surface of the elastomer seal pressure-formable into a tortuous fluid path between the elastomer seal and the sealing surface of the central member by shape-deforming the intermediate portion of the elastomer seal into sealing engagement with the sealing surface of the central member by increasing the pressure in a chamber located proximate the elastomer seal.

2. The butterfly valve of claim 1 wherein the elastomer seal circumferential legs comprise a set of integral circumferential legs for supporting the elastomer seal in said housing with the sealing surface of the elastomer seal comprising a smoothly contoured sealing surface and the sealing surface of the central member having a set of circumferential grooves to form an undulating sealing region with the elastomer seal shape deformable to the set of circumferential grooves to form a bubble tight seal therebetween.

3. The butterfly valve of claim 1 wherein the elastomer seal is shape deformable into bubble tight sealing engagement with a set of circumferential grooves on the central member by increasing the pressure in a chamber located proximate the elastomer seal.

4. The butterfly valve of claim 3 wherein the central member includes a peripheral cooling channel for maintaining the temperature of a portion of the central member that contacts the expandable seal when the central member is in a closed condition.

5. A butterfly valve for opening and closing a passage comprising;
   a housing;
   a central member pivotally mounted in said housing with said central member having a sealing surface wherein the sealing surface on said central member includes a sealing ridge and a sealing groove; and
   an inflatable elastomer seal having a set of circumferential legs providing a tensile resistance to an expansion of the elastomer while an intermediate portion of the elastomer seal between the set of circumferential legs is free to deflect without overcoming the tensile resistance so that a sealing surface of the elastomer seal between the set of circumferential legs can be shape deformed into regions of a higher pressure engagement with a portion of the sealing surface of the central member to thereby form a tortuous fluid path therebetween.

* * * * *